April 6, 1954

C. E. EARLE ET AL 2,674,469

FLUID COUPLING

Filed July 30, 1948

INVENTOR
CLARENCE E. EARLE, AND
CARL A. COVINGTON,
BY Raymond W Bolton
ATTORNEY

April 6, 1954
C. E. EARLE ET AL
2,674,469
FLUID COUPLING
Filed July 30, 1948
4 Sheets-Sheet 2
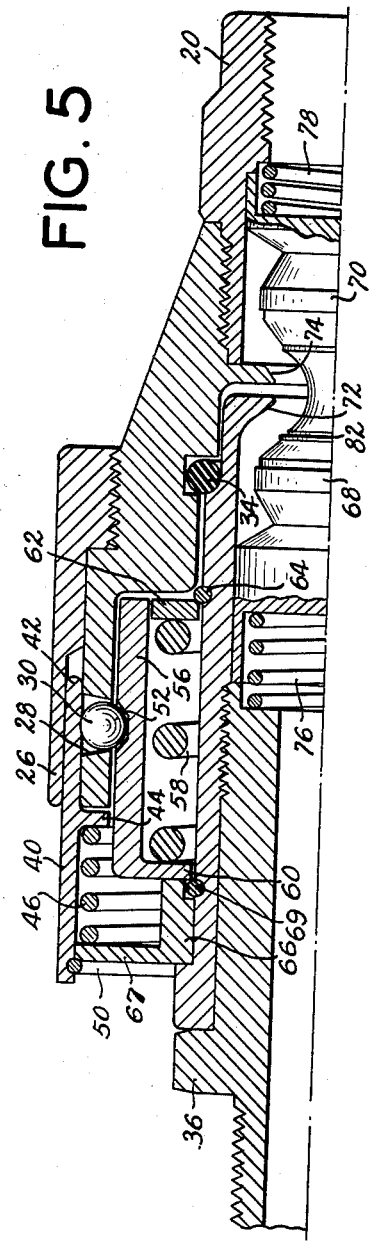
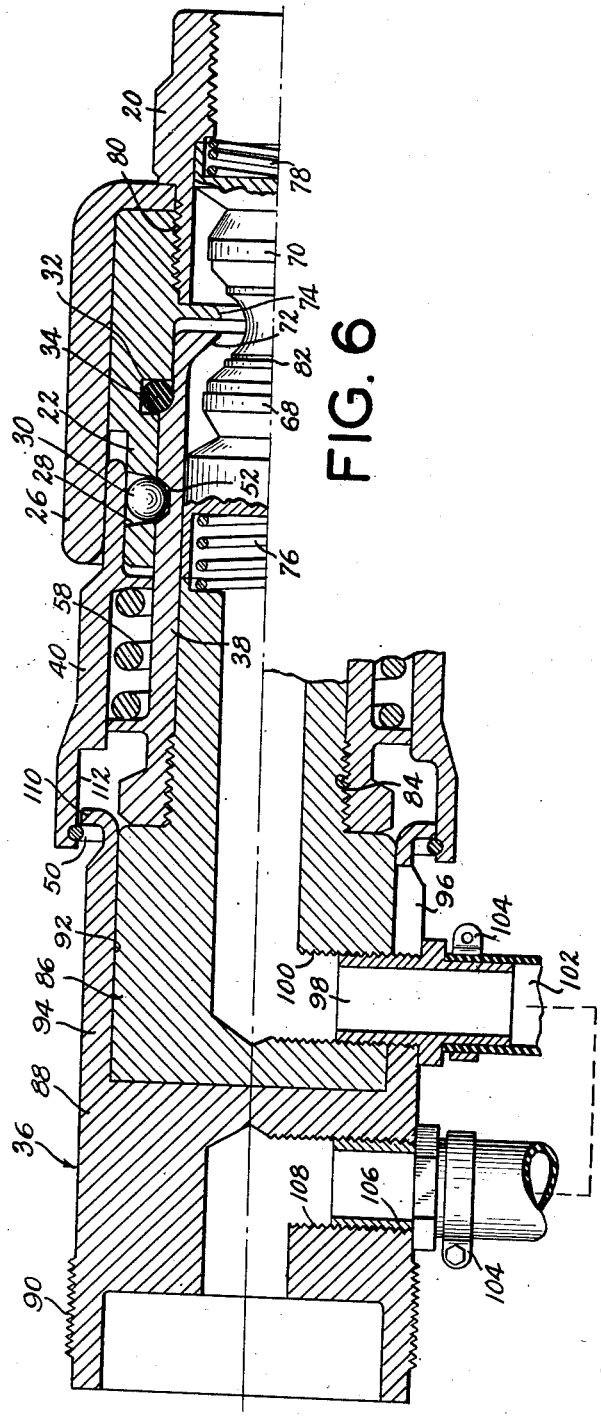
INVENTOR
CLARENCE E. EARLE, AND
CARL A. COVINGTON
By Raymond W Colton
ATTORNEY

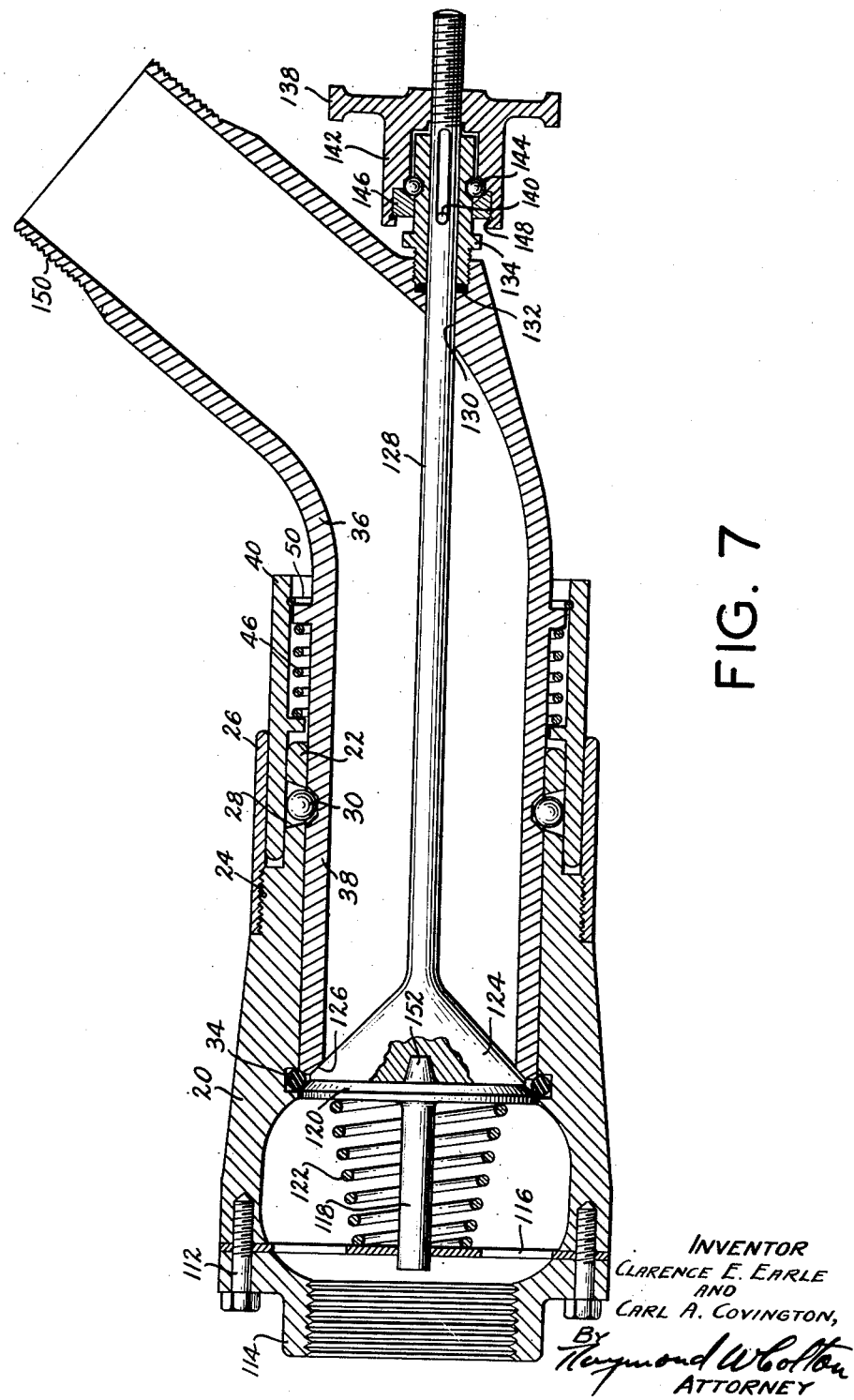

April 6, 1954

C. E. EARLE ET AL 2,674,469

FLUID COUPLING

Filed July 30, 1948

INVENTOR
CLARENCE E. EARLE, AND
CARL A. COVINGTON,

BY Raymond Woolton

ATTORNEY

Patented Apr. 6, 1954

2,674,469

UNITED STATES PATENT OFFICE 2,674,469

FLUID COUPLING

Clarence E. Earle, Washington, D. C., and
Carl A. Covington Arlington, Va.

Application July 30, 1948, Serial No. 41,538

11 Claims. (Cl. 284—18)

This invention relates to couplings of the plug and socket type, and particularly to fluid couplings of this type.

There are many installations requiring couplings which can be separated manually and which will become disconnected automatically and without breakage in response to excessive tension on the line including the coupling and/or fluid pressure within the coupling itself. There is also a need for a coupling one or both of whose members will be automatically closed upon separation of the coupling and automatically opened for fluid flow upon coupling of its members.

These various requirements have been satisfied according to the present invention by the provision of a coupling comprising plug and socket members having interfitting double end walls, a detent carried by the walls of one of the members for engagement with the other of the members, the walls of the other of the members being relatively movable axially for selectively projecting and releasing the detent. The relatively movable walls are preferably provided with means for limiting their relative movement in both directions. The relatively movable walls are preferably biased towards a detent projecting position by means of a spring interposed between them. One of these walls may provide an annular groove for reception of the detent, at least one of the surfaces defining the groove being radially inclined to define a cam surface for cooperation with the detent. The detent may comprise one or more, preferably more, pocketed balls which can be projected through the inner wall of the one member by the relatively movable wall of the other member into the groove formed in the relatively fixed wall of the other member.

Fluid couplings contemplated by the present invention are preferably provided with sealing gaskets carried by one of the members for engagement with the other. A valve may be carried by one of the members and an actuator therefor by the other. Interacting valves may be carried by both members, the opening and closing of which may be accomplished automatically upon the coupling and uncoupling movements respectively, or the actuation may be accomplished manually. The member provided with the relatively movable wall may be connected with an element slidable with respect thereto to release the detent in response to a predetermined movement of the element. This predetermined movement may be that resulting from separation of the coupling members, which members may be biased to restrain them against separation by means of a spring. Release of the detent may be achieved by means responsive to a predetermined fluid pressure for shifting the movable wall, a predetermined tension on the coupling or jointly by either or both of these effects. The movable wall will in most cases provide gripping surfaces for manual separation of the coupling members. In the various forms depicted for illustration herein, the coupling operation involves a snap action since the detent restrains movement of the relatively movable wall of one of the members until the groove in its other wall registers with the detent, whereupon the relatively movable wall forces the detent into the groove with a snap action under the influence of a biasing spring which has become compressed during the relative movement of the walls.

A more complete understanding of the present invention will follow from a detailed description of the attached drawings wherein:

Fig. 5 is a sectional elevation, partially broken away, of a coupling which automatically separates in response to excessive internal pressure or tension;

Fig. 6 is a sectional elevation, partially broken away, of a modified form of coupling;

Fig. 7 is a sectional elevation of another type of coupling embodying the invention;

Figure 1:
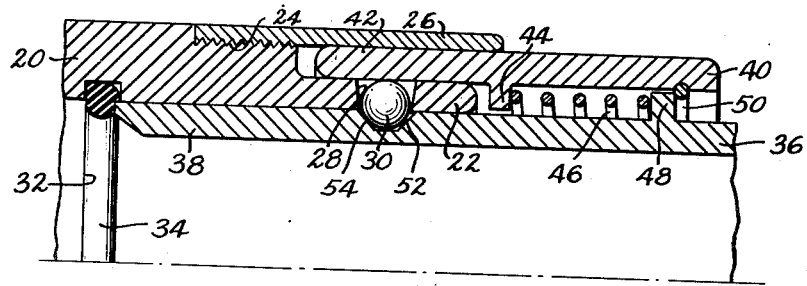
Fig. 1 is a sectional elevation, partially broken away, depicting the coupling with its members interengaged.

The socket member 20, as shown in Figs. 1 to 4 is provided with a reduced end 22 defining an inner wall and with an intermediate reduced threaded portion 24 for reception of an internally threaded sleeve 26 defining an outer wall. The inner wall 22 is perforated at desired intervals around its periphery to define pockets 28 which converge inwardly to receive and retain detent balls 30. The socket member is provided with an internal groove 32 for the reception of a resilient sealing member 34 which may be of the O-ring type, a toroidal rubber like body. A plug member 36 is provided with a leading end 38 for engagement with the sealing member and defining an inner wall. A sleeve 40 carried by the plug member constitutes a relatively movable outer wall whose leading end 42 is received in the groove defined between the inner and outer walls of the socket member. The relatively movable outer wall 40 is formed with an intermediate flange 44 providing a bearing surface for a spring 46 interposed between it and a flange 48 formed externally on the inner wall of the plug member. A retainer ring 50 is seated in a groove formed internally of the relatively movable wall to limit its forward movement under the influence of the spring with respect to the inner wall. The inner wall receives an external annular groove 52 having an inclined surface 54 which serves as a cam to release the detent element during a separating movement of the coupling members.

Figure 2:
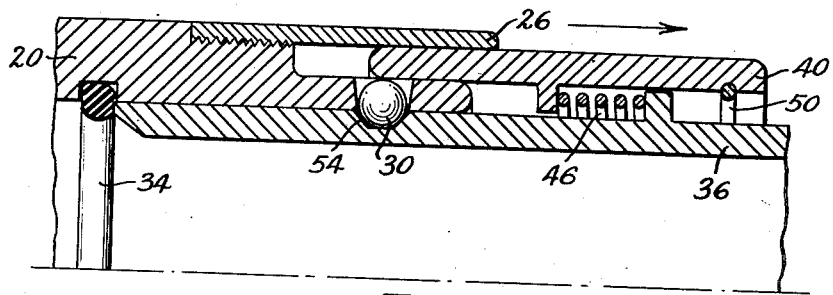
Fig. 2 is a sectional elevation, partially broken away depicting the coupling of Fig. 1 as its members are being separated.
Figure 3:
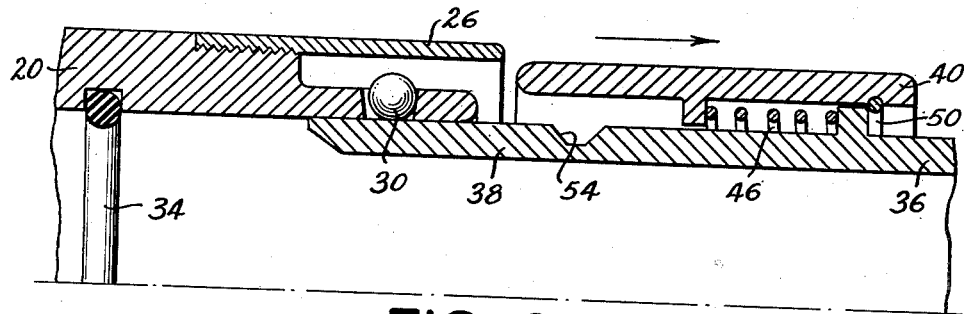
Fig. 3 is a sectional elevation, partially broken away, depicting the coupling of Fig. 1 with its members separated to a greater degree.
Figure 4:
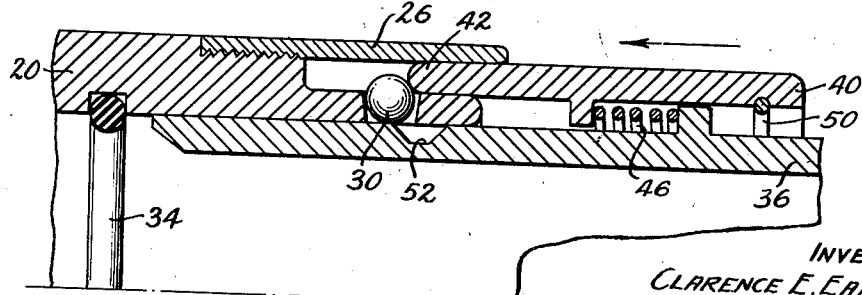
Fig. 4 is a sectional elevation, partially broken away, showing the coupling of Fig. 1 with the members being moved towards their coupled relationship.

Fig. 2 shows the relative positions of the parts as they are being separated by movement, in the direction of the arrow, of the sleeve or relatively movable outer wall 40 which has just begun to uncover the detent ball 30 against the force of the spring 46. As soon as the outer wall 40 has been moved far enough in the direction of the arrow to release the detent balls 30, the force transmitted to the inner wall 38 through the spring will urge the balls outwardly due to the camming effect of the surface 54 and the parts will assume relative positions corresponding to those depicted in Fig. 3 from which positions they can be entirely separated. When it is desired to couple the members, they will be pushed together through a position corresponding to that shown in Fig. 4 until the leading edge 42 of the outer wall 40 engages the detent 30, further forward movement of the plug 36 compressing the spring 46 until the groove 52 registers with the detent, whereupon the force transmitted from the spring through the sleeve or relatively movable wall 40 will project the detent into the groove with a snap action returning the parts to the relative positions shown in Fig. 1.

Insofar as applicable, the reference characters discussed with reference to Figs. 1 to 4 have been carried over in describing the corresponding portions of the other figures. In Fig. 5, the plug member 36 comprises additional parts, the groove 52 for receiving the detent being formed in the surface of a sleeve 56 biased towards its normal position shown by means of a spring 58 of predetermined strength interposed between an inturned flange 60 formed on the sleeve and a washer 62 positioned by a retainer 64 seated in a groove formed in the plug member. The spring 58 urges the sleeve 56 into abutment with a sleeve 66 having a radial flange 67 which serves as a limiting stop for the relatively movable outer wall 40 by engagement with the retainer ring 50 thereof. A retainer ring 69 secures the sleeve 66 against movement on the plug 36 where automatic separation of the coupling is desired in response to excessive fluid pressure or mechanical tension. By omitting the ring 69, the coupling will not separate automatically but will absorb vibrations that might otherwise cause damage to the balls 30.

The plug and socket members are provided with interengaging valves 68 and 70 having seats 72 and 74 towards which they are biased by springs 76 and 78, all respectively. With the parts in the positions depicted in Fig. 5, it will be clear that the coupling can be separated by manually shifting the movable outer wall 40 towards the left against the force of the spring 46 until the detent 30 is released, in a manner similar to that described with reference to Figs. 1 to 4 inclusive. Where the internal pressure of the fluid passing through the coupling exceeds a predetermined value, it exerts a force to separate and uncouple the plug and socket members automatically. Assuming that the plug member 36 is stationary, the socket member 20 will tend to move towards the right, carrying with it the sleeve 66 interlocked therewith by the detent 30 against the spring 58 against the stop and compressing the spring 58 against the stop defined by the washer 62 and retainer ring 64. Depending upon the fluid pressure and calibration of the spring 58, this movement will continue until the forward edge 42 of the movable wall or sleeve 40 uncovers the detent 30, whereupon the camming action of the surface of the groove 52 forces the detent radially outwardly and the members can be separated. A similar action is experienced when tension is applied to the ends of the members 20 and 36, as would be occasioned, for example, where the coupling is used between a tractor and trailer. In such a case, where the draw bar connection should fail or be disconnected, it will be clear that the fluid coupling will separate automatically without breakage of its components or external connections, and at the same time, the internal valves 68 and 70 will prevent the loss of any appreciable fluid. Upon reassembling such a coupling, the internal valves will engage one another at their abutting surface 82 and reopen automatically as the coupling operation progresses, to assume once more the positions depicted in Fig. 5.

The modified form of the coupling appearing in Fig. 6 provides automatic release when tension on the members, or in the line containing the members, exceeds a predetermined value. As in the previous cases, manual separation is likewise possible. The socket member 20 again provides a reduced end 22 defining an inner wall and a counterbored sleeve 26 defining an outer wall, these parts being suitably secured together as by screw threads 80 as shown. An internal groove 32 formed in the inner wall of the socket member, serves to receive a sealing member 34 and a suitable number of pockets 28 receive a corresponding number of detent balls 30. The socket member is provided with an internal valve 70 cooperating with a seat 74 towards which it is biased by a spring 78 interposed between the valve and a fixed portion of the socket member. In the assembled condition shown, the valve 70 has a surface 82 which abuts a similar surface of the cooperating valve 68 which engages a seat 72 under the influence of a spring 76 biasing the valve to such a position as the members are separated. The leading end 38 of the plug member 36 contains a groove 52 for registry with the detent ball or balls 30 when the members are assembled. This leading end or inner wall defining member is suitably secured by means of threads 84 to a body member 86 which partakes of telescopic movement with respect to a terminal member 88 in which it is slidably received. The terminal member has a threaded end 90 which may be secured to a suitable support or in a fluid line, the opposite end of the terminal member containing a counterbore 92 defining a skirt 94 containing a radial slot 96 through which a nipple 98 is threaded into a transverse bore 100 of the body member 86. A flexible tube 102 secured to the outer end of the nipple 98 by means of a suitable clamp 104, extends to a similar nipple 106 threaded into a transverse bore 108 formed in the terminal member 88, the tube being secured to the second nipple by means of a similar clamp 104. The forward end of the terminal member is provided with an out-turned flange 110 which is received within a counterbore 112 formed in the member 40 defining the outer wall of the plug member, these parts being connected by means of a retainer ring 50. Where it is desired to separate the parts manually, the relatively movable outer wall or sleeve 40 of the plug member can be retracted from the socket member against the force of the calibrated spring 58 until the ball or balls are released for outward radial movement by the camming surface of the groove 52, whereupon the members can be entirely separated their valves closing automatically during the separating operation. When the members are subjected to tension, assuming the socket member 20 to remain stationary, the terminal member 88 will move to the left, transmitting this motion through the retainer ring 50 to the movable outer wall, or sleeve 40 against the force of the spring 58. When the tension is of sufficient value to retract the leading end of the sleeve 40 to a position uncovering the balls, the entire plug assembly will be withdrawn from the socket assembly as occurred in the manual operation. The flexibility of the tube 102 readily permits the degree of movement between the body and terminal members 86 and 88 permitted by the length of the slot 96. Thus here again, when the coupling is subject to excessive tension, the members will separate without breakage and their internal valves will close automatically without any appreciable loss of fluid.

Fig. 7 depicts an application of the coupling of the present invention to the under-wing filling of aircraft fuel tanks. In this application, the socket member 20 is secured by bolts 112 to a flange 114 carried by the fuel tank or similar apparatus. A spider 116 is interposed between the flange and socket member to serve as a guide for the stem 118 of a valve 120 biased by means of a spring 122 towards its resilient seat 34 which also serves as the sealing member for the leading end of the plug member 36. The plug member contains a valve 124 having a seat 126 formed in the leading end of the plug member, a stem 128 for actuating this valve extending through an opening 130 provided in a curved portion of the wall of the plug member, the opening being counterbored to receive a toroidal rubber-like packing 132 sufficiently deformed to provide a seal by means of a gland nut 134. The valve stem 128 terminates in a threaded end 136 which receives an internally threaded hand wheel 138 for advancing or retracting the valve 124. A pin 140 secured in a projecting portion of the gland nut 134 cooperates with a slot 142 in the valve stem to permit axial movement thereof and at the same time prevent rotation. The hand wheel receives antifriction bearings 144 positioned by an annulus 146 and a retainer ring 148. The trailing end of the plug member is provided with threads 150 for connection with a suitable supply line. The coupling and uncoupling operations are effected precisely as described with reference to Figs. 1 to 4 inclusive, and in addition, by operation of the hand wheel 138, the valves 120 and 124 can be opened after the coupling has been made and closed before it is broken to avoid the escape of any liquid, which in the case of high test gasoline, might well be quite important. As will be noted from Fig. 7, the valve 120 is provided with a guide pin 152 for registry with a complementary socket in the end of the valve 124 to assure proper registry.

Figure 8:
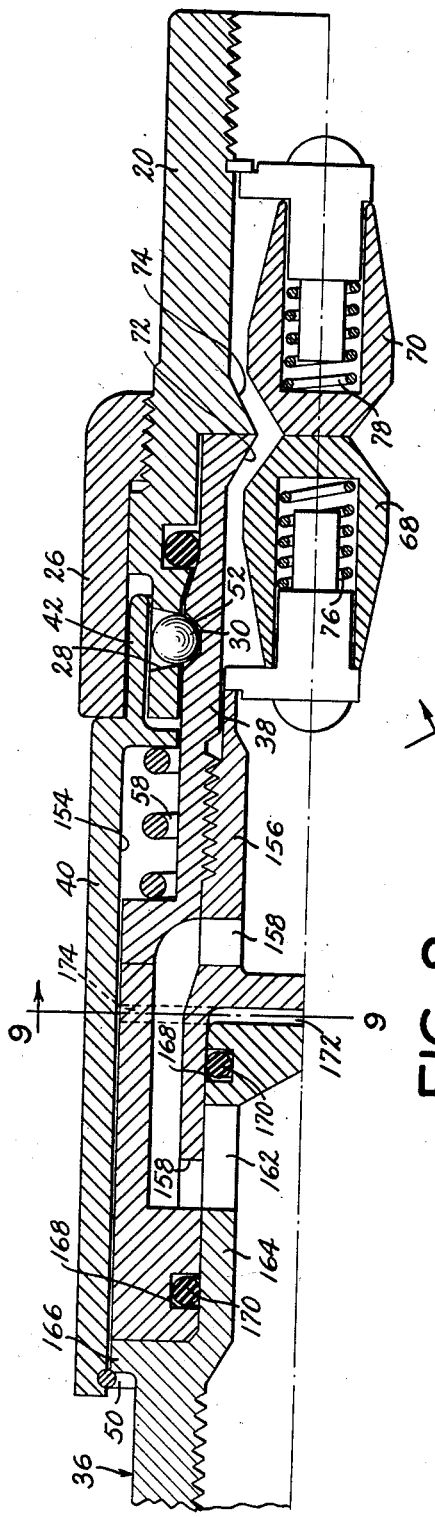
Fig. 8 is a sectional elevation partially broken away of a further modification.
Figure 9:
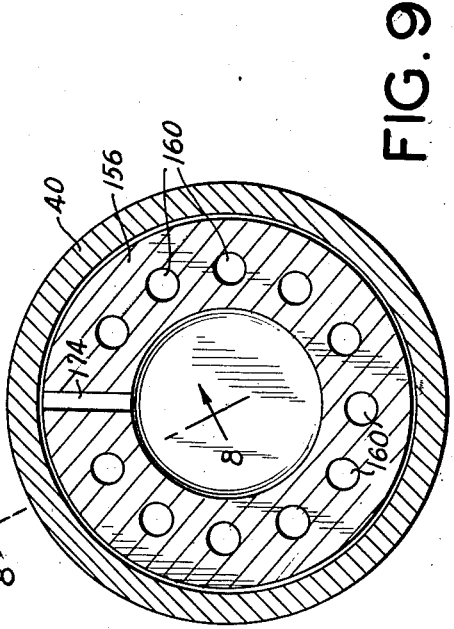
Fig. 9 is a section taken along line 9—9 of Fig. 8.

Figs. 8 and 9 depict a further modification of the invention having functions similar to those described with reference to Fig. 6. The socket member 20 and its components are substantially the same as the corresponding parts described with reference to Fig. 6. The plug member 36 comprises the inner wall 38 providing the annular detent receiving groove 52 surrounded by the relatively movable wall or sleeve 40 biased forwardly by means of the spring 58 received in its counterbore 154. In this case, the internally threaded wall 38 receives the threaded end of a body member 156 communicating through its radial passage 158 and axial passages 160 with transverse passages 162 formed in a relatively telescopic terminal member 164. This terminal member provides an external flange 166 received internally by the sleeve 40 and retained therein by the retainer ring 50. The telescopic body and terminal members 156 and 164 contain grooves 168 for the reception of toroidal rubber or rubber-like O-rings 170. The aggregate area of the axial passages 160 is approximately the same as the area of the bores of the coupling members themselves so that there will be no substantial resistance imposed to the flow of fluid through the line. In order that no fluid will be entrapped between the telescopic body and terminal members, the space 172 defined between them is provided with a radial vent 174 to atmosphere.

As in the preceding modifications, manual separation will be effected by retracting the relatively movable sleeve or outer wall 40 to the left until its end uncovers the balls 30, whereupon the balls will be urged outwardly from the groove 52 and the parts can be separated. Where the coupling members are subjected to tension, assuming the socket assembly 20 to be fixed, the terminal member 164 will move towards the left engaging the retainer ring 50 and transmitting the motion to the sleeve 40 against the force of the spring 58 until the balls 30 are uncovered sufficiently to move beyond the annular groove 52, whereupon the assembly will be separated as before. The valves 68 and 70 will function in a manner similar to that described with reference to Figs. 5 and 6, thus assuring that no appreciable quantities of fluid will be lost during coupling and uncoupling operations.

Although several forms of the invention have been described by way of illustration, many more applications will suggest themselves to those skilled in the art, just as such applications have occurred already to the present inventors. Accordingly, the scope of the invention should not be restricted to the illustrations presented, beyond the scope of the appended claims.

We claim:

1. An automatic coupling comprising plug and socket members, relatively movable spaced axial walls carried by one of said members, a biasing spring relatively positioning said walls, a wall provided by the other of said members carrying a radially shiftable detent projecting therebeyond into the path of at east one of said axial walls, one of said axial walls containing a detent receiving annular groove and having a portion engaging said detent during a coupling operation to shift said detent into the path of the other of said axial walls and restrain movement thereof until said detent and groove achieve registry, said other axial wall having a detent actuating portion normally positioned axially intermediate said groove and detent engaging portion and a substantially cylindrical detent retaining surface overlying said detent when said members are coupled, whereupon said other of the axial walls is shifted by said spring to retain said detent in said groove upon registry of said detent and groove.

2. An automatic coupling as set forth in claim 1 wherein said groove and detent carrying wall have a combined radial dimension exceeding that of said detent.

3. An automatic coupling as set forth in claim 1 wherein said detent is a ball.

4. An automatic coupling as set forth in claim 1 wherein said spring is disposed between said relatively movable walls.

5. An automatic coupling as set forth in claim 1 wherein said annular groove includes a cam surface engageable with said detent to move it radially during separation of said members.

6. An automatic coupling as set forth in claim 1 wherein a fluid seal is carried by one of said members for engagement with the other of said members when they are coupled.

7. An automatic coupling as set forth in claim 1 wherein a valve is carried by one of said members and an actuator is carried by the other of said members for actuating said valve during a coupling operation.

8. An automatic coupling as set forth in claim 1 wherein an element is slidably connected with said other axial wall to release said detent in response to a predetermined movement.

9. An automatic coupling as set forth in claim 1 wherein said other of said members is provided with a second wall overlying said detent for reception of the detent actuating portion of said other axial wall.

10. An automatic coupling as set forth in claim 1 wherein an element is slidably connected with said other axial wall to release said detent in response to a predetermined movement, and said biasing spring urges said element in opposition to said movement.

11. An automatic coupling as set forth in claim 1 wherein means responsive to a predetermined fluid pressure is connected with one of said relatively movable walls under coupled conditions to effect relative movement thereof to release said detent.

References Cited in the file of this patent

UNITED STATES PATENTS

| Number | Name | Date |
|---|---|---|
| 1,587,079 | Machino | June 1, 1926 |
| 2,159,242 | Yanagi | May 23, 1939 |
| 2,307,427 | Smith et al. | Jan. 5, 1943 |
| 2,377,812 | Scheiwer | June 5, 1945 |
| 2,386,270 | Samiran | Oct. 9, 1945 |
| 2,425,500 | Wiggins | Aug. 12, 1947 |
| 2,439,275 | Spotz | Apr. 6, 1948 |
| 2,441,363 | Krueger | May 11, 1948 |
| 2,453,741 | Bopp | Nov. 16, 1948 |
| 2,461,700 | Scheiwer | Feb. 15, 1949 |
| 2,471,237 | Pasturczak | May 24, 1949 |
| 2,536,702 | Scheiwer | Jan. 2, 1951 |